United States Patent
Guntermann et al.

(10) Patent No.: US 11,183,902 B2
(45) Date of Patent: Nov. 23, 2021

(54) DEVICE FOR DRIVING A COMPRESSOR AND METHOD FOR ASSEMBLING OF THE DEVICE

(71) Applicant: Hanon Systems, Daejeon (KR)

(72) Inventors: Bernd Guntermann, Lennestadt (DE); David Walisko, Hürth (DE); Stephan Heinrichs, Hürtgenwald (DE)

(73) Assignee: Hanon Systems, Daejeon (KR)

( * ) Notice: Subject to any disclaimer, the term of this patent is extended or adjusted under 35 U.S.C. 154(b) by 174 days.

(21) Appl. No.: 16/384,112

(22) Filed: Apr. 15, 2019

(65) Prior Publication Data

US 2019/0331121 A1   Oct. 31, 2019

(30) Foreign Application Priority Data

Apr. 26, 2018 (DE) .......................... 102018110042.6
Mar. 25, 2019 (DE) .......................... 102019107520.3

(51) Int. Cl.
| | |
|---|---|
| *H02K 5/22* | (2006.01) |
| *F04D 25/06* | (2006.01) |
| *H02K 5/24* | (2006.01) |
| *F04B 35/04* | (2006.01) |

(Continued)

(52) U.S. Cl.
CPC ............ *H02K 5/225* (2013.01); *F04B 35/04* (2013.01); *F04B 39/0044* (2013.01);
(Continued)

(58) Field of Classification Search
CPC ........ H02K 3/522; H02K 5/225; H02K 11/33; H02K 3/50; H02K 2203/06; H02K 5/08; H02K 5/24; F04B 39/127; F04B 35/04; F04B 39/0044; F04B 39/121; F04B 39/0072; F04B 39/12; F04B 39/023; Y10S 417/902
See application file for complete search history.

(56) References Cited

U.S. PATENT DOCUMENTS

| 3,075,686 A | * | 1/1963 | Steinhagen | ............. F25B 31/02 |
| | | | | 417/363 |
| 3,897,177 A | * | 7/1975 | Parker | ..................... F04B 39/12 |
| | | | | 417/363 |

(Continued)

FOREIGN PATENT DOCUMENTS

| CN | 202931046 U | 5/2013 |
| JP | H0529257 U | 4/1993 |

(Continued)

*Primary Examiner* — Peter J Bertheaud
(74) *Attorney, Agent, or Firm* — Norton Rose Fulbright US LLP; James R. Crawford

(57) ABSTRACT

A device for driving a compressor of a gaseous fluid, in particular an electric motor. The device comprises a rotor and a stator which are disposed extending along a common longitudinal axis. A carrier element is disposed in contact on a first end side, oriented in an axial direction, of the stator, which carrier element comprises at least one resiliently deformable pressure element with a contact region. The pressure element is developed extending with an extent in the axial direction and, in a mounted state of the device, is in contact with the contact region on a mating surface under resilient deformation. A method for mounting and a use of the device is also provided.

16 Claims, 2 Drawing Sheets

(51) Int. Cl.
*F04B 39/12* (2006.01)
*H02K 3/50* (2006.01)
*H02K 11/33* (2016.01)
*H02K 3/52* (2006.01)
*F04B 39/00* (2006.01)
*H02K 5/08* (2006.01)
*F04B 39/02* (2006.01)

(52) U.S. Cl.
CPC ........ *F04B 39/0072* (2013.01); *F04B 39/121* (2013.01); *F04B 39/127* (2013.01); *F04D 25/0606* (2013.01); *H02K 3/50* (2013.01); *H02K 3/522* (2013.01); *H02K 5/24* (2013.01); *H02K 11/33* (2016.01); *F04B 39/023* (2013.01); *F04B 39/12* (2013.01); *F05B 2210/12* (2013.01); *F05B 2230/60* (2013.01); *H02K 5/08* (2013.01); *H02K 2203/06* (2013.01); *Y10S 417/902* (2013.01)

(56) References Cited

U.S. PATENT DOCUMENTS

| | | | | |
|---|---|---|---|---|
| 5,252,038 A * | 10/1993 | Mangyo | ................ | F04B 39/127 417/363 |
| 5,934,884 A * | 8/1999 | Son | ................ | F04B 39/127 417/363 |
| 6,485,271 B1 * | 11/2002 | Tack | ................ | F04B 39/127 417/363 |
| 7,402,925 B2 * | 7/2008 | Best | ................ | H02K 3/522 310/67 R |
| 8,113,797 B2 * | 2/2012 | Valbjoern | ................ | F04B 35/04 417/363 |
| 8,836,184 B2 * | 9/2014 | Cho | ................ | F04B 35/04 310/71 |
| 8,888,468 B2 * | 11/2014 | Maganhoto | ................ | F04B 39/127 417/363 |
| 9,099,896 B2 * | 8/2015 | Hofmann | ................ | H02K 3/522 |
| 9,331,420 B2 * | 5/2016 | Bedell | ................ | F04C 23/008 |
| 10,008,902 B2 * | 6/2018 | Urabe | ................ | H02K 3/522 |
| 10,815,995 B2 * | 10/2020 | Heo | ................ | F04C 29/005 |

FOREIGN PATENT DOCUMENTS

| | | |
|---|---|---|
| JP | H0541380 U | 6/1993 |
| JP | H06165443 A | 6/1994 |
| JP | H11355996 A | 12/1999 |
| JP | 2004304902 A | 10/2004 |
| JP | 2014090573 A | 5/2014 |
| KR | 20180023166 A | 3/2018 |
| WO | 2014061073 A1 | 4/2014 |

* cited by examiner

DEVICE FOR DRIVING A COMPRESSOR AND METHOD FOR ASSEMBLING OF THE DEVICE

This application claims priority from German Patent Application Nos. 102018110042.6 filed on Apr. 26, 2018 and 102019107520.3 filed on Mar. 25, 2019. The entire contents of these applications are incorporated herein by reference in their entirety.

FIELD OF THE INVENTION

The invention relates to a device for driving a compressor, in particular an electric motor, for the compression of a gaseous fluid, specifically of a refrigerant. The compressor can be employed in the refrigerant circuit of a climate control system of a motor vehicle. The device comprises a rotor and a stator disposed along a common longitudinal axis.

The invention relates, moreover, to a method for mounting the device for driving a compressor.

BACKGROUND OF THE INVENTION

Compressors known in prior art for mobile applications, in particular for climate control systems of motor vehicles, for the conveyance of refrigerant through a refrigerant circuit, also termed refrigerant compressors, are often developed, independently of the refrigerant, as piston compressors with variable stroke displacement or as scroll compressors. The compressors herein are driven either electrically or by a belt pulley.

Apart from the electric motor for driving the particular compressor mechanism, an electrically driven compressor comprises an inverter for driving the electric motor. The inverter serves for converting the direct current of a motor vehicle battery into alternating current which is supplied to the electric motor across electric lines.

Conventional electric motors of the electrically driven compressors are implemented with an annular stator core with coils disposed thereon and a rotor, wherein the rotor is disposed within the stator core. Rotor and stator are oriented on a common axis of symmetry or rotational axis of the rotor.

The inverter comprises plug connections for the electric connection with connections of the electric motor, which, in turn, are electrically connected with the coils of the stator. The connections of the electric motor are developed in a connector housing disposed on an end side of the stator oriented in an axial direction of the stator.

In prior art electric motors of electrically driven compressors a connector housing is secured by pressing it onto the stator insulation. The connector housing is fixed in position during the assembly. During operation of the compressor, and thus of the electric motor, the press fit generated during the assembly between the connector housing and the stator insulation can become detached so that the connector housing moves and oscillates relative to the surrounding, in particular relative to the stator insulation which causes material abrasion on the faces that are disposed in contact on one another. The connector housing is connected with the stator insulation with the aid of latching mechanisms, in particular across snap-in hooks.

OBJECTS OF THE INVENTION

The invention addresses the problem of providing a device for driving an electrically driven compressor of a gaseous fluid, in particular of an electric motor, which can be assembled simply and therewith time-savingly. The stator is herein in particular to be easily disposable within a motor housing and the connector housing to be securable in a predefined position on the stator. Furthermore, the device is to be implemented such that vibrations on the connector housing occurring during operation of the device are reduced or eliminated. The device is to have the least possible number of individual components and structural parts as well as be constructionally simply realizable in order to minimize also the costs of production.

SUMMARY OF THE INVENTION

The problem is resolved through the subject matters with the characteristics of the independent patent claims. Further developments are specified in the dependent patent claims.

The problem is resolved through a device, in particular an electric motor, according to the invention for driving a compressor of a gaseous fluid. The device comprises a rotor and a stationary stator which extend along a common longitudinal axis.

The stator is advantageously positioned in the radial direction on an outer side of the rotor and encompasses the rotor.

According to the concept of the invention, a carrier element is disposed on a first end side of the stator and oriented in an axial direction. The carrier element comprises at least one resiliently deformable pressure element with a contact region. The pressure element is herein developed extending with an extent in the axial direction. In a mounted state of the device the pressure element is in contact with the contact region on a mating surface under resilient deformation.

Due to the pressure applied through the resilient deformation of the pressure element onto the carrier element, the carrier element is pressed against the stator and in this manner protection against undesirable relative movements of the carrier element with respect to the stator is ensured.

By axial direction is herein understood the direction of the longitudinal axis of the stator, which also corresponds to the longitudinal direction and the rotational axis of the rotor. An end side oriented in the axial direction is disposed in a plane oriented perpendicularly to the longitudinal axis.

The contact region of the pressure element can be implemented, for example, as a contact area, as a contact edge or also in the form of a point.

According to a further development of the invention, the carrier element is developed with a receiving element for a connector housing with connector ports.

The pressure element and the receiving element with connection passages for passing through connection elements into the connector ports of the connector housing are preferably disposed on a common side, oriented in the axial direction, of the carrier element.

One advantage of the invention comprises that the carrier element, the pressure element and the receiving element for the connector housing are developed as a coherent unit and as an integral components such that the pressure element and the receiving element are a constituent of the carrier element. The carrier element is therewith implemented as a multifunctional component, in particular, of the stator.

Due to the pressure applied onto the carrier element through the resilient deformation of the pressure element, the carrier element with the receiving element with the connection passages for the connector housing with the connector ports is pressed against the stator and in this manner also protection against undesirable relative movements of the connector housing, or of the connector ports, with respect to the stator is ensured.

The pressure element is preferably implemented in the form of an arc and comprises a web. The web is preferably substantially oriented in the axial direction, while the contact region, especially at an implementation as a contact area, is substantially disposed in the radial direction.

After the device is mounted, the web, in particular, of the pressure element is resiliently deformed.

According to a further development of the invention, the pressure element is connected across a front edge of the web with the carrier element. The pressure element advantageously comprises the contact region at an end developed distally to the front edge of the web.

According to a preferred embodiment of the invention, the carrier element is developed with a radially oriented annular surface as well as with an axially oriented annular surface, which are disposed adjoining one another at outer side edges and are connected with one another. The pressure element is preferably in connection with the radially oriented annular surface of the carrier element.

The radially oriented annular surface of the carrier element advantageously has the form of a circular ring, in particular of a sector of a circular annulus or of an open circular annulus, while the axially oriented annular surface of the carrier element is developed in the form of a cylinder, in particular in a circular cylindrical form, particularly hollow cylindrical form. The pressure element is disposed in particular in a region of the radially oriented annular surface of the carrier element, specifically at an inner side edge or margin of the annular surface.

The receiving element for the connector housing is preferably developed as a subregion of the radially oriented annular surface of the carrier element.

According to a further advantageous embodiment of the invention, at an implementation of the carrier element with a multiplicity of pressure elements, the pressure elements are disposed on the carrier element uniformly distributed over the circumference. By multiplicity is to be understood at least two pressure elements.

The problem is also resolved through a method according to the invention for mounting the device for driving a compressor of a gaseous fluid, in particular of an electric motor. The method comprises the following steps:
  disposing a rotor and a stator on a common longitudinal axis, with the stator encompassing the rotor in the radial direction,
  disposing a carrier element on a first end side, oriented in an axial direction, of the stator, wherein a resilient pressure element is oriented extending with an extent in the axial direction, as well as
  disposing the stator with the carrier element on a mating surface, wherein the pressure element with a contact region is in contact on the mating surface and is resiliently deformed such that between the carrier element and the mating surface a force, in particular a compressive force, is generated and the carrier element is pressed in the axial direction against the stator and is stayed.

According to a further development of the invention, a connector housing is introduced into a receiving element developed on the carrier element and in this manner is secured in position on the carrier element.

The advantageous implementation of the invention enables the use of the device for driving a compressor, in particular of an electric motor, for the compression of a gaseous fluid for a compressor of a refrigerant in a refrigerant circuit of a motor vehicle climate control system.

In summary, the device according to the invention for driving a compressor of a gaseous fluid with a minimal number of required components comprises further diverse advantages:
  Simple assembly of the device, especially during the emplacement of the stator with the rotor within the motor housing, specifically by securing the connector housing in position on the stator,
  Apart from the protection against undesirable relative movements, especially generated through vibrations, of the stator with the carrier element in relation to the motor housing during operation of the compressor, the receiving element, and therewith the connector housing with the connector ports, is also secured in position on the stator,
  thereby avoidance of abrasion as well as reduction of vibration-caused destruction at the intersection of the connector ports between stator and inverter, in particular of electric pins, and maximizing of the service life of the compressor.

Further details, characteristics and advantages of embodiments of the invention will become evident based on the following description of embodiment examples with reference to the associated drawing.

DETAILED DESCRIPTION

Figure 1:
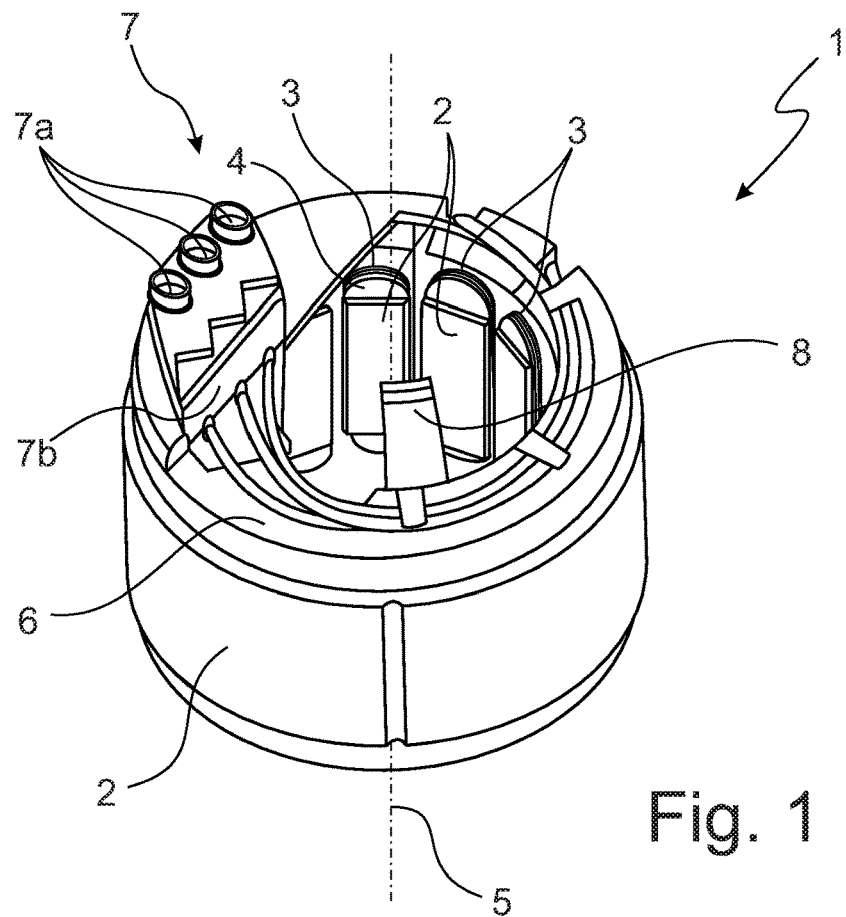
FIG. 1: a stator of an electric motor as a device for driving a compressor of a gaseous fluid, with a stator core, coils, an insulation element and a carrier element in a perspective view.

In FIG. 1 is shown in a perspective view a stator 1 of an electric motor as a device for driving a compressor of a gaseous fluid, especially for a motor vehicle climate control system, for the conveyance of refrigerant through a refrigerant circuit. The stator 1 is developed with a stator core 2, coils 3, and insulation element 4 as well as with a carrier element 6.

The electric motor, for example a 3-phase alternating current motor, comprises a rotor, not shown, and the stator core 2 disposed in the radial direction on an outer side of the rotor and therewith disposed about the rotor. Both, the stator core 2, preferably developed as a laminated sheet package, and the insulation element 4, developed of an electrically insulating material, extend along a longitudinal axis 5, that also corresponds to the longitudinal axis of stator 1 and the rotational axis of the rotor, from a first end side to a second end side of stator 1. The insulation element 4 is advantageously developed as an extrusion coating of the stator core 2 and thus forms an integral component.

The coils 3 are developed of a wire wound about a region of the stator core 2 that extends inwardly in the radial direction. The regions, extending inwardly in the radial direction, of stator core 2 have the form of a web and are positioned with uniform distribution over the circumference of an outer wall of stator core 2. Between the wires of coils 3 and the particular regions of stator core 2 the insulation element 4 is disposed which insulates the stator core 2 and the wires of coils 3 with respect to one another. The insulation element 4 is developed at the ends, oriented inwardly and in the axial direction, of the webs so as to be expanded in the axial direction. The end segments projecting thusly of the insulation element 4 serve for fixing the wires, wound about the webs of stator core 2, of coils 3. The stator core 2, the insulation element 4 and the coils 3 form the stator unit of the electric motor.

The insulation element 4 projects at the end sides of stator 1 beyond the stator core 2. At the first end side of stator 1 a carrier element 6 is disposed with a receiving element 7 with connection passages 7a for a connector housing 7b with connector ports. The connector ports of the connector housing 7b serve as a component of an electrical connection between coils 3 of the electric motor and the inverter, for example with the aid of electrically conducting, pin-form connection elements which, passed through the connection passages 7a of the receiving element 7 of carrier element 6, are plugged into the connector ports of the connector housing 7b.

In the mounted state of stator 1, the carrier element 6 is in contact in the axial direction, on the one hand, on stator 1, in particular on stator core 2. The outer diameter of the carrier element 6 is herein less than the outer diameter of the stator core 2.

The carrier element 6, moreover, comprises, on the other hand, a resilient pressure element 8 that extends substantially in the axial direction. The pressure element 8 is consequently disposed on the side, facing away from the stator core 2, of the carrier element 6.

Figure 2:
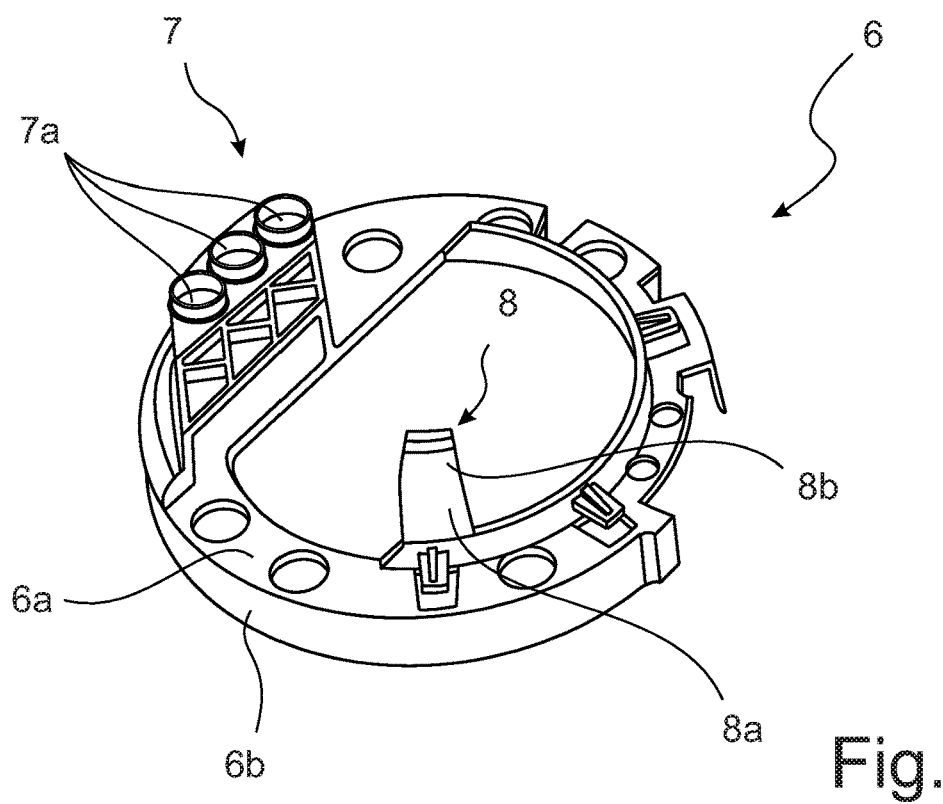
FIG. 2: the carrier element with a resilient pressure element in a perspective view.

FIG. 2 shows in perspective view the carrier element 6 with the resilient pressure element 8 and the receiving element 7 with the connection passages 7a for the connector housing 7b with the connector ports. The pressure element 8 and the receiving element 7 are disposed on a common side oriented in the axial direction.

The carrier element 6 comprises a radially oriented circular ring-shaped annular surface 6a, in particular a sector of a circular ring-shaped annular surface as well as an axially oriented cylindrical annular surface 6b, which adjoin one another at outer side edges and are disposed in connection with one another. The receiving element 7 for the connector housing 7b is developed as a subregion of the radially oriented annular surface 6a.

The cylindrical wall of the axially oriented annular surface 6b of carrier element 6 is implemented with an outer diameter that is smaller than the outer diameter of the outer wall of stator core 2.

The resilient pressure element 8 is disposed in a region, in particular of an inner side edge, of the radially oriented circular ring-shaped annular surface 6a, and preferably has the form of an arc or a spring. The pressure element 8, as well as the receiving element 7 for the connector housing 7b, is developed as a constituent part of the carrier element 6. The carrier element 6 with the radial annular surface 6a, the axial annular surface 6b, the receiving element 7 with the connection passages 7a for the connector housing 7b with the connector ports and the pressure element 8 is implemented in particular as an integral injection molded element. The integral formation is realized within a molding process.

The pressure element 8 comprises a web 8a, oriented substantially in the axial direction, and a contact region 8b, oriented substantially in the radial direction. The pressure element 8 Is connected across a front edge of the web 8a with the radial annular surface 6a. At an end, developed distally to the front edge of the web 8a, the pressure element 8 comprises the contact region 8b which is advantageously developed as a contact area. In the mounted state of the electric motor the pressure element 8 is in contact with its contact region 8b on a housing, not shown, of the electric motor. When mounting the stator 1 with the carrier element 6 within the motor housing, which means specifically during the installation or the shrinking or pressing-in of the stator 1 into the motor housing and the pressure of the motor housing applied in the process onto the pressure element 8, in particular the web 8a of pressure element 8, is resiliently deformed.

Figure 3:
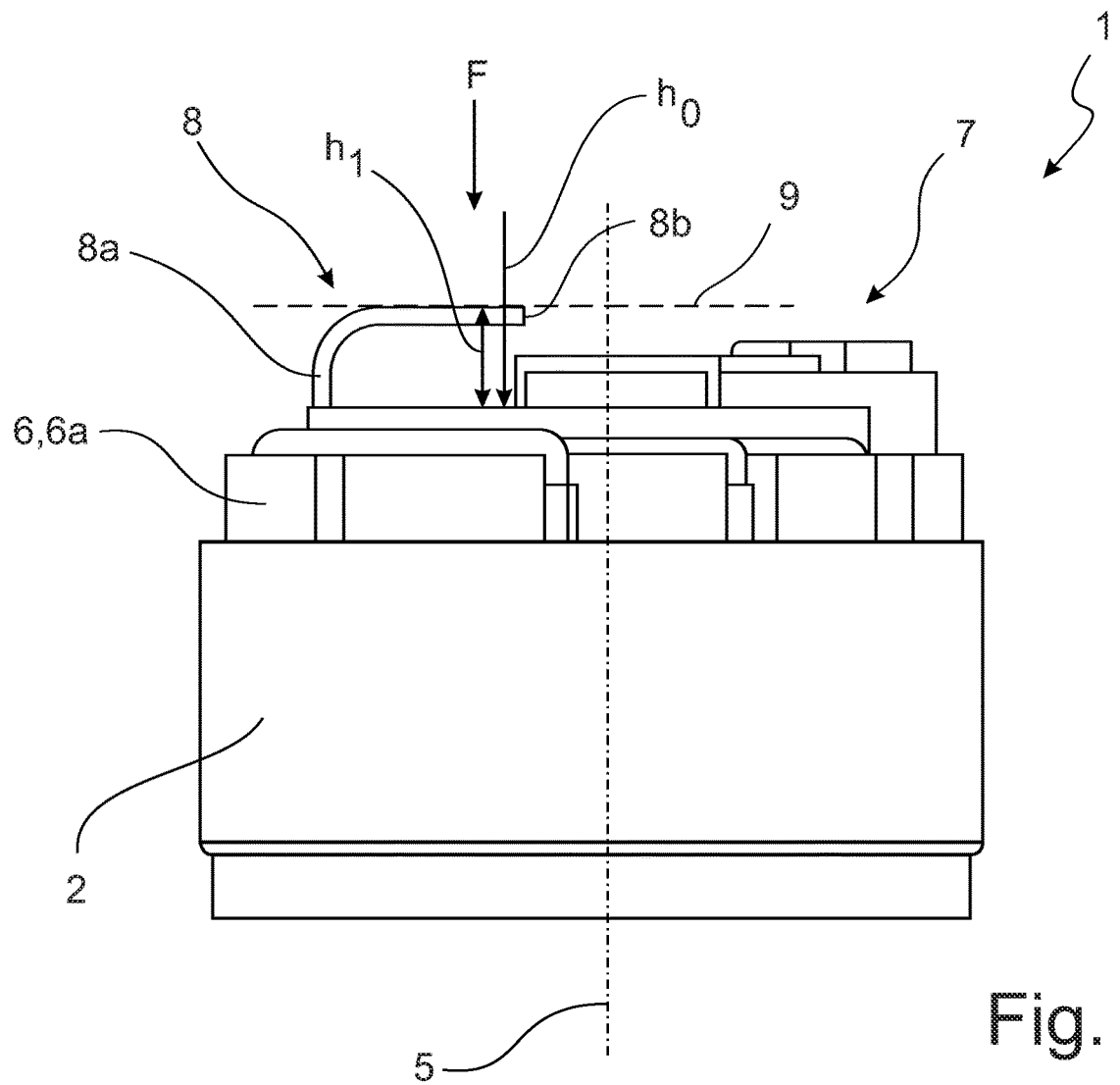
FIG. 3: the stator of FIG. 1 in the mounted state and installed within a motor housing of the electric motor in lateral view.

FIG. 3 shows in lateral view the stator 1 of FIG. 1 in the mounted state installed within the motor housing of the electric motor. The resiliently deformed pressure element 8 extends with an extent h in the axial direction and with its contact region 8b is in contact on a mating surface 9, in particular on the motor housing of the electric motor. The pressure element 8 is deformed by a difference $h_0-h_1$, where $h_0$ describes the extension of the pressure element 8 in the starting state, or in the non-mounted state of stator 1, and $h_1$ the extension of the pressure element 8 in the mounted state of stator 1 in the motor housing. Therewith applies $h_0>h_1$.

As a component of carrier element 6, the pressure element 8 has a rigidity defined and corresponding to the geometry and the mechanical dimensions of the carrier element 6. During the mounting of the stator 1 in the motor housing, between the carrier element 6 and the mating surface 9 as a closed end of the motor housing a force F, in particular a spring force, acting substantially in the axial direction, is built up and in this manner the carrier element 6, due to the resilient properties of the pressure element 8, is pressed in the direction of stator 1, in particular in the direction of the stator core 2. Herein, with the contact of pressure element 8 on the mating surface 9 of the motor housing and the resilient deformation particularly of the web 8a of pressure element 8, the force F acts onto the carrier element 6. Consequently, after the completion of the mounting of the electric motor, and thus after the completion of the insertion or pressing-in of stator 1 with the carrier element 6 into the motor housing, by means of the deformation of the pressure element 8 a prestress is generated which stays the carrier element 6 and prevents any movement of the carrier element 6 during the operation of the electric motor and therewith of the compressor. The carrier element 6 is herein secured in position specifically in the axial direction.

The pressure element 6 serves herein also for the complete elimination of vibrations of the carrier element 6 during operation of the compressor, independently of the particular operating conditions. The resulting force F is layed out such that all tolerance constellations are covered.

According to a, not shown, alternative implementation, the carrier element is developed with a multiplicity of pressure elements in any distribution over the circumference. By multiplicity is herein to be understood at least two pressure elements. The number and disposition of the pressure elements depends on the geometry of the electric motor, in particular of the carrier element.

LIST OF REFERENCE SYMBOLS

1 Stator
2 Stator core
3 Coil
4 Insulation element
5 Longitudinal axis
6 Carrier element
6a Radial annular surface 6b Axial annular surface
7 Receiving element
7a Connection passage
7b Connector housing
8 Pressure element
8a Web
8b Contact region
9 Mating surface
h Extension pressure element 8 in the axial direction
h0 in the starting state
h1 in the mounted state
F effective direction F

What is claimed:

1. A device for driving a compressor of a gaseous fluid comprising a rotor and a stator which are disposed extending along a common longitudinal axis, wherein a carrier element is disposed in contact on a first end side oriented in an axial direction of the stator, which carrier element comprises at least one resiliently deformable pressure element with a contact region, wherein the pressure element extends with an extent (h) in the axial direction and, in a mounted state the device contacts its contact region on a mating surface under resilient deformation;
   wherein the carrier element is implemented with a receiving element with connection passages for a connector housing with connector ports.

2. A device according to claim 1, wherein the pressure element and the receiving element are disposed on a common side, oriented in an axial direction, of the carrier element.

3. A device according to claim 1, wherein the carrier element, the pressure element and the receiving element are developed as a coherent unit as an integral component.

4. A device for driving a compressor of a gaseous fluid comprising a rotor and a stator which are disposed extending along a common longitudinal axis, wherein a carrier element is disposed in contact on a first end side oriented in an axial direction of the stator, which carrier element comprises at least one resiliently deformable pressure element with a contact region, wherein the pressure element extends with an extent (h) in the axial direction and, in a mounted state the device contacts with its contact region on a mating surface under resilient deformation, wherein the pressure element is developed in the form of an arc and comprises a web; and
   wherein the web is disposed oriented in the axial direction and the contact region is oriented in the radial direction.

5. A device according to claim 4, wherein the pressure element is connected with the carrier element across a front edge of the web.

6. A device according to claim 5, wherein the pressure element comprises the contact region at an end developed distally to the front edge of the web.

7. A device for driving a compressor of a gaseous fluid comprising a rotor and a stator which are disposed extending along a common longitudinal axis, wherein a carrier element is disposed in contact on a first end side oriented in an axial direction of the stator, which carrier element comprises at least one resiliently deformable pressure element with a contact region, wherein the pressure element extends with an extent (h) in the axial direction and, in a mounted state of the device contacts its contact region on a mating surface under resilient deformation, wherein the carrier element comprises a radially oriented annular surface as well as an axially oriented annular surface, which are disposed adjoining one another at outer side edges and are connected with one another;
   wherein the axially oriented annular surface of the carrier element has the form of a cylinder.

8. A device according to claim 7, wherein the pressure element is connected with the radially oriented annular surface of the carrier element.

9. A device according to claim 7, wherein the radially oriented annular surface of carrier element has the form of a circular ring.

10. A device according to claim 9, wherein the pressure element is disposed in a region of the radially oriented annular surface of the carrier element.

11. A device according to claim 1, wherein at an implementation of the carrier element with a multiplicity of pressure elements the pressure elements are disposed on the carrier element distributed over a circumference.

12. A method for mounting the device for driving a compressor of a gaseous fluid according to claim 1, comprising the following steps:
   disposing the rotor and the stator on a common longitudinal axis, with the stator encompassing the rotor in the radial direction,
   disposing the carrier element on a first end side, oriented in an axial direction, of the stator, wherein the resilient pressure element is oriented extending with an extent (h) in the axial direction, as well as
   disposing the stator with the carrier element on a mating surface, wherein the pressure element with a contact region is in contact on the mating surface and is resiliently deformed such that between the carrier element and the mating surface a force (F), is generated and the carrier element is pressed in the axial direction against a stator core of the stator and is stayed;
   wherein a connector housing is introduced into a receiving element developed on the carrier element and in this manner is fixed in position on the carrier element.

13. A method comprising driving a compressor with the device of claim 1 to compress a gaseous fluid, wherein the gaseous fluid is a refrigerant in a refrigerant circuit of a motor vehicle climate control system.

14. A device according to claim 1, wherein at an implementation of the carrier element with a multiplicity of pressure elements the pressure elements are disposed on the carrier element distributed over a circumference.

15. A device according to claim 2, wherein at an implementation of the carrier element with a multiplicity of pressure elements the pressure elements are disposed on the carrier element distributed over a circumference.

16. A device according to claim 3, wherein at an implementation of the carrier element with a multiplicity of pressure elements the pressure elements are disposed on the carrier element distributed over a circumference.

* * * * *